United States Patent [19]

Sadowski

[11] 4,123,900
[45] Nov. 7, 1978

[54] COUPLING DEVICE

[76] Inventor: Alexander M. Sadowski, 2073 San Sebastian Way, North, Clearwater, Fla. 33515

[21] Appl. No.: 798,327

[22] Filed: May 19, 1977

[51] Int. Cl.$^2$ ............................................. F16G 15/04
[52] U.S. Cl. ................................ 59/83; 24/230.5 W; 46/216; 59/85; 114/114; 223/85; 248/339; 403/209
[58] Field of Search .................. 59/78, 80, 83, 84, 85, 59/93; 24/230.5 W, 230.5 R, 230.5 AD, 230.5 TP, 237, 201 HE, 228; 403/209; 248/318, 339, 340, 343, 317; 46/216; 114/108, 114; 223/85

[56] References Cited

U.S. PATENT DOCUMENTS

| 985,210 | 2/1911 | Sanders | 24/228 |
|---|---|---|---|
| 1,443,022 | 1/1923 | Heilscher | 248/318 |
| 1,511,002 | 10/1924 | Pfautz | 24/230.5 TP |
| 1,817,825 | 8/1931 | Johnson | 59/85 |
| 1,933,586 | 11/1933 | De Long | 24/228 |
| 2,016,756 | 10/1935 | Taylor | 24/230.5 R |
| 2,254,153 | 8/1941 | Larrabee | 46/216 |
| 2,442,243 | 5/1948 | Lloyd | 59/85 |
| 3,188,039 | 6/1965 | Krohn | 248/317 |

Primary Examiner—C.W. Lanham
Assistant Examiner—Gene P. Crosby
Attorney, Agent, or Firm—Stein & Frijouf

[57] ABSTRACT

A coupling or chain connector device is disclosed comprising a first coupling member cooperable with a second coupling member. The second coupling member has a tortuous path between the inner and the outer regions thereof. The tortuous path comprises a first through fourth substantially linear sections and a first through third interconnecting sections sequentially interposed between the first through fourth linear sections. The first coupling member is at least partially receivable in the second coupling member for passing the first coupling member through the tortuous path to couple the first coupling member to the second coupling member. The first coupling member may take the form of a linear wire or bar or may take the form of a substantially ring-shaped structure. The first and second coupling members may be incorporated into a unitary structure with the first coupling member established on one end thereof and the second coupling member established on the other end thereof. In this configuration, a plurality of coupling members may be coupled to form a chain structure.

16 Claims, 11 Drawing Figures

U.S. Patent  Nov. 7, 1978  4,123,900
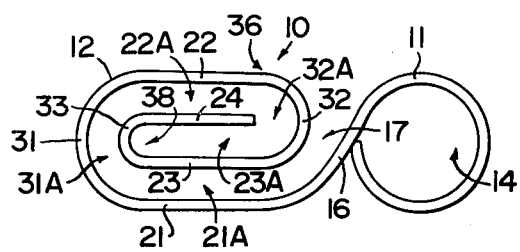

COUPLING DEVICE

BACKGROUND OF THE INVENTION

1. Field of the Invention

This invention relates to supports or chains and more particularly to hook-type article claspings.

2. Description of the Prior Art

The prior art has developed numerous types of connecting or coupling devices for use as buckles or for interconnecting chain sections or links. Each of these types of connecting devices were developed for solving a specific need of the chain or coupling industry. For example, U.S. Pat. No. 601,240 discloses a hook incorporating a generally spiralling path for fastening to a link of a chain or the like. U.S. Pat. No. 1,511,002 discloses a connecting lock for interconnecting two links of a chain.

Unfortunately, the aforementioned patents and other prior art couplings have failed to provide a universal fastening device which is simple to manufacture, is reliable and can be used for a multitude of applications. The prior art has further failed to provide a universal fastening device which may be fabricated from a metallic material for use with chain, chain link connectors and the like, or which may be fabricated from a plastic material for use as a toy or decorative element.

Therefore it is an object of this invention to provide an apparatus which overcomes the aforementioned inadequacies of the prior art devices and provides an improvement which is a significant contribution to the advancement of the chain coupling art.

Another object of this invention is to provide a coupling comprising a first and a second coupling member with the second coupling member having a tortuous path between the outer and inner regions of the second coupling member, with the first coupling member being at least being partially receivable for passing through the tortuous path to couple the first coupling member to the second coupling member.

Another object of this invention is to provide a coupling comprising a first and a second coupling member with a tortuous path in the second coupling member comprising a first through fourth substantially linear sections and a first through third interconnecting sections sequentially interposed between the first through fourth linear sections.

Another object of this invention is to provide a coupling comprising a first and a second coupling member wherein the first coupling member comprises a supporting bar with the second coupling member being connected to a garment hanger, thereby requiring a complex movement of the second coupling member to remove the hanger from the first coupling member.

Another object of this invention is to provide a coupling comprising a first and a second coupling member wherein the first coupling member is mounted on a first toy vehicle and the second coupling member is mounted on a second toy vehicle for coupling the toy vehicles together.

Another object of this invention is to provide a coupling comprising a first and a second coupling member wherein the second coupling member is cooperable with a wire support such as a guide wire of a sailboat.

Another object of this invention is to provide a coupling comprising a plurality of coupling members each being substantially identical to one another with each coupling having a ring-shaped portion at one end and a tortuous path at the other end of the coupling member for interconnecting adjacent coupling members to provide a chain structure.

Other objects and a fuller understanding of this invention may be had by referring to the summary of the invention, the description and the claims, taken in conjunction with the accompanying drawings.

SUMMARY OF THE INVENTION

The invention may be incorporated into a coupling comprising a first coupling member and a second coupling member having a tortuous path between the outer and the inner regions of the second coupling member. The tortuous path comprises first through fourth substantially linear sections and first through third interconnecting sections sequentially interposed between the first through fourth linear sections. The first through fourth linear sections are established in decreasing linear dimensions. The first coupling member is at least partially receivable in the second coupling member for passing the first coupling member through the tortuous path to couple the first coupling member to the second coupling member.

The invention may also be incorporated into a coupling structure comprising a plurality of coupling members each being substantially identical to one another. Each of the plurality of coupling members has a substantially ring-shaped portion at one end of the coupling member and a tortuous path at the other end of the coupling member. The tortuous path comprises a plurality of linear regions and a plurality of interconnecting regions interposed between the plurality of linear regions. At least a part of each of the ring-shaped portions is capable of passing through the tortuous path of the next adjacent one of the plurality of coupling members to couple the plurality of coupling members into a chain structure. Each of the plurality of coupling members may be a unitary structure with the linear dimensions of the linear region being greater than the diameter of the ring-shaped portions, thereby decreasing the probability of accidental decoupling.

The first coupling member may define a substantially ring-shaped member or may be a substantially linear member such as a wire or a support bar. In one embodiment, first connecting means mounts the second coupling member to a support which may include an additional first coupling member or an additional second coupling member or the like. In one specific embodiment, the first connecting means includes a garment hanger or means connecting the second coupling member to a fabric material such as a sail or a tarpaulin.

In another specific example of the instant invention, the coupling includes second connecting means for mounting the first coupling member to a support. The second connecting means may include a second coupling member or a ring-shaped region incapable of receiving the second coupling member.

In still another specific example of the invention, the second connecting member includes a substantially ring-shaped region capable of receiving the second coupling member.

The invention may also be utilized with the first coupling member being mounted to a first vehicle and the second coupling member being mounted to a second vehicle such as a toy car, toy train, or the like. The major portion of the second coupling member may be established parallel or traverse to the major portion of the first connecting means.

This invention accordingly comprises an apparatus possessing the features, properties and the relation of elements which will be exemplified in the apparatus hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 1 is an elevational view of the preferred embodiment of the instant invention;

FIG. 2 is an elevational view of the first step in a sequence of coupling a first coupling member to a second coupling member;

FIG. 3 is an elevational view of the second step in a sequence of coupling the first coupling member to the second coupling member;

FIG. 4 is an elevational view of the third step in a sequence of coupling the first coupling member to the second coupling member;

FIG. 5 is an elevational view showing the coupling members of FIG. 4 with the first coupling member being established traversely to the second coupling member;

FIG. 6 is a modification of the invention shown in FIGS. 1-5 wherein the coupling is used to support a container;

FIG. 7 is a second modification of the invention wherein the coupling is used to support a garment hanger;

FIG. 8 is a third modification of the invention wherein the coupling member is used to secure a fabric to a guide wire;

FIG. 9 is an application of the invention shown in FIGS. 1-5 for adjustably supporting a chain lamp;

FIG. 10 is a fourth modification of the invention wherein the second coupling member has plural tortuous paths; and FIG. 11 is a fifth modification of the invention wherein the first coupling member is connected to a first vehicle and the second coupling member is connected to a second vehicle.

Similar reference characters refer to similar parts through the several views of the drawings.

DETAILED DESCRIPTION

FIG. 1 is an elevational view of the preferred embodiment of the invention illustrating a coupling 10 comprising a first coupling member 11 and a second coupling member 12. The coupling 10 is shown in this embodiment as a metallic coupling, being of unitary construction and formed in the shape as shown in FIG. 1. It should be understood that the coupling 10 may be of a plastic or similar material molded into the form shown by an appropriate fabrication process. The first coupling member 11 defines a substantially ring-shaped region 14, but it is understood that an elliptical, polygonal or like region may be defined by the first coupling member 11. In this embodiment, the first coupling member is shown formed in a substantially circular manner with connecting means including bend 16 interconnecting the first and second coupling members 11 and 12.

The second coupling member 12 includes first through fourth substantially parallel linear sections 21-24 with first through third interconnecting sections 31-33 sequentially interposed between the first through fourth linear sections 21-24. The interconnecting sections 31-33 are shown as substantially circular bends, but it is understood that sharper bends or breaks may also be suitable for the instant invention. The first through fourth linear sections 21-24 have decreasing linear dimensions with the linear dimensions of each of the linear sections 21-24 being greater than the diameter of the substantially ring-shaped region 14 defined by the first coupling member 11. This relationship enables the coupling to remain interconnected during vibration and the like as will be hereinafter described.

The first through fourth linear sections 21-24 and the interconnecting sections 31-33 define a tortuous path between an outer region 36 and an inner region 38 of the second coupling member 12. More specifically, the tortuous path comprises a curved entrance region 17 coupled to a first linear region 21A, a first curved region 31A, a second linear region 22A, a second curved region 32A, and a third linear region 23A terminating at the internal region 38. It should be noted that the structure does not have any projecting terminating edges as was found in the prior art. Projecting edges are more likely to become entangled, rip fabric material or the like. In addition, projecting edges make the coupling unsafe for numerous applications, such as the use in toy structures.

FIG. 2 shows the first step of coupling plural coupling members 10 and 10', each being substantially identical to one another. The first coupling member 11' of coupling 10' is to be engaged with the second coupling member 12 of coupling 10. The ring-shaped region 14' of coupling 10' is sufficiently large to encompass the lateral space between the second and third linear sections 22 and 23 of coupling 10 as shown in FIG. 2. The ring-shaped regions 14 and 14' each have a diameter which is less than the linear dimensions of the second and third linear sections 22 and 23. It is this interrelation of dimensions between the ring-shaped region 14' and the second and third linear sections 22 and 23 which in part provides a superior coupling. A portion of the first coupling member 10' is inserted through the curved section 17 into the linear section 21A of coupling 10 as shown in FIG. 2. FIG. 3 illustrates the result of continued movement of the first coupling member 11' as indicated by the arrow. The first coupling member 11' is now located at the first bend 31A of coupling 10. Continued movement through linear section 22A, curved section 32A and linear section 23A establishes the first coupling member at the inner region 38 of the coupling 10 as shown in FIG. 4. Since the diameter of the ring-shaped region 14' is smaller than the linear dimensions of the linear sections 21-24, surface 40 contacts interconnecting section 31 when coupling 10' is moved towards the right in FIG. 4. The diameter of ring-shaped region 11' is also less than the spacing between interconnecting sections 31 and 33 added to the linear dimension of the fourth linear section 24. Accordingly, couplings 10 and 10' can be decoupled only when the coupling 10' is established at an angle α as shown in phantom in FIG. 5 from the normal position at 10'. The angle α shown in FIG. 5 is determined in part by the spacing between the first and third interconnecting sections 31 and 33 of coupling 10 in relation to the diameter of the ring-shaped region 14' of the first coupling member 11'. The angle α may range from 15° to 50°. A large value of the angle α makes the probability of decoupling of the couplings 10 and 10' very remote in the event that tension is released between the couplings 10 and 10' and that coupling 10' is allowed to move toward the right in FIG. 5. The prior art has failed to appreciate the cooperation of an elongated coupling in combination with a substantially ring-shaped region to accomplish the coupling as set forth in FIGS. 1–5.

FIGS. 6–8 illustrate three variations of the invention shown in FIGS. 1–5 and three specific applications of the invention. In FIG. 6, a first coupling member 11A is shown as a wire or a rod support cooperating with the second coupling member 12A of a coupling 10A. First connecting means 16A connects the second coupling member 12A to a substantially ring-shaped region 42 which is substantially smaller than the ring-shaped regions shown in FIGS. 1–5 and is therefore incapable of receiving the second coupling member 12. The ring-shaped region 42 receives a wire handle 44 of a container 46. The device 10A ensures that the container 46 will not be accidentally decoupled from wire 11A if the container 46 is accidentally moved upwardly. The use of the instant invention provides a significant safety factor when the container 46 is used above a pedestrian area.

FIG. 7 illustrates a second modification of a coupling 10B including a first coupling member 11B shown as a wire support. In this embodiment, the second coupling members 12B are connected through first connecting means 16B to garment hangers 48. The incorporation of the instant invention for garment hangers reduces the possibility of a garment being accidentally disconnected from the supporting bar 11B, thereby falling on the floor and requiring cleaning before sale. In addition, the instant invention prevents the simultaneous removal of a large number of garments from the bar 11B. For example, it is well known that thieves will, in many cases, remove a large number of garments from a rack and carry them to a waiting vehicle. The incorporation of the instant invention makes it extremely difficult to unhook a large number of garments at a single time. Accordingly, only one or a few garments can be removed at a single time, thereby requiring more time for thieves to remove all of the garments.

FIG. 8 illustrates a third modification of a coupling 10C including a first coupling member 11C shown as a wire and second coupling 12C. The first connecting means 16C includes a ring-shaped region 50 with the major portion thereof established transverse to the major portion of the second coupling member 12C. The ring-shaped region 50 may be sewn into a fabric material 52, such as a sail or a tarpaulin. For example, the fabric material 52 may be a jib sail of a boat established adjacent a guide wire 11C by couplings 10C.

FIG. 9 illustrates a plurality of the coupling 10 shown in FIGS. 1–5 with the first coupling member 11 connected to the second coupling member 12 of the adjacent coupling 10. It should be understood that the interconnecting means 16 may be considered either a first or a second interconnecting means for connecting the first or second coupling members, respectively, to a support.

The plurality of couplings 10 suspend a lamp 54 from a ceiling or similar structure 56 in a chain-like fashion. The height of lamp 54 may be readily adjusted by the addition or removal of one or a plurality of couplings 10.

FIG. 10 illustrates still another variation of a second coupling member 12D which is connected through first connecting means 16D to an additional second coupling member 12D'. In this embodiment, the second coupling member 12D is shown having substantially linear interconnecting sections 31D–33D. The use of substantially linear interconnecting sections with sharp bends may be incorporated into any of the devices shown in FIGS. 1–11. This coupling may be used to connect two conventional chain links of two conventional chains or the like. The terminal end of the chains operate in a manner similar to the ring-shaped regions 14 of the first coupling member 11 as shown in FIGS. 1–5.

In this embodiment, the second coupling member 12D is secured to a first coupling member 11D which is shown as a small closed ring incapable of being received between the second and third linear sections 22D and 23D. The ring 11D is secured to second coupling member 12D by inserting the ring 11D about the terminal end 68 and moving the ring along the fourth 24D, third 23D and second 22D linear sections as shown by the arrows.

FIG. 11 illustrates an additional variation of the invention shown in FIGS. 1–10 comprising a coupling 10E wherein the first coupling member 11E is a ring-shaped member similar to the first coupling member 11 in FIGS. 1–5 and is connected by first connecting means 61 to a first vehicle 71. The second coupling member 12E is connected through a second connecting means 62 to a second vehicle 72. The vehicle 71 and 72 may be toy vehicles for child entertainment. It should be appreciated that the couplings 11E and 12E are safe, having no projecting edges and being in compliance with modern standards and guidelines for child toy safety.

The invention has been described as a coupling device with the various applications being presented herein. It should be appreciated that the invention finds application in many other instances, such as an adjustable chain, which would not have to be bought in fixed lengths. The length can be easily adjusted without cutting or breaking the chain. The use of the instant invention as a toy teaches manual dexterity for children making long chains. A plurality of couplings may be made in assorted colors, allowing children to make chains or webs of various colors and shapes. Plural couplings may be used to form chain curtains or room dividers or other decorations in the form of a web or strand curtain devices. The invention can be used as a fastener or clamp for jewelry, buckle belts, ropes, chains, wires and the like.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangment of parts may be resorted to without departing from the spirit and scope of the invention.

Now that the invention has been described:

I claim:

1. A coupling, comprising in combination:
   a first coupling member;
   a second coupling member having a tortuous path between the outer and the inner region of said second coupling member;
   said tortuous path comprising first through fourth substantially linear sections and first through third interconnecting sections sequentially interposed between said first through fourth linear sections;

said first through fourth substantially linear sections being substantially parallel to one another; and means establishing said first coupling member to be at least partially receivable in said second coupling member for passing said first coupling member through said tortuous path to couple said first coupling member to said second coupling member.

2. A coupling as set forth in claim 1, wherein said first through fourth linear sections have decreasing linear dimensions.

3. A coupling as set forth in claim 1, wherein said first coupling member defines a substantially ring-shaped region.

4. A coupling as set forth in claim 1 including first connecting means for connecting an additional second coupling member to said second coupling member.

5. A coupling as set forth in claim 1 including a garment hanger connected to said second coupling member.

6. A coupling as set forth in claim 1 including first connecting means for connecting a substantially ring-shaped region capable of receiving said second coupling member to said second coupling member.

7. A coupling as set forth in claim 1, wherein each of said first through third interconnecting sections are curved regions.

8. A coupling as set forth in claim 1, wherein said first coupling member is mounted to a first vehicle and said second coupling member is mounted to a second vehicle.

9. A coupling as set forth in claim 1, including first connection means for mounting said second coupling member to a support; and the major portion of said second coupling member being traversely established relative to the major portion of said first coupling member.

10. A coupling structure, comprising in combination:
a plurality of couplings each being substantially identical to one another;
each of said plurality of couplings having a substantially ring-shaped portion at one end of said coupling;
each of said plurality of couplings having a tortuous path at the other end of said coupling;
said tortuous path comprising a plurality of linear regions and a plurality of interconnecting regions interposed between said plurality of linear regions; and
at least a part of each of said ring-shaped portions being capable of passing through said tortuous path of the next adjacent one of said plurality of couplings to couple said plurality of couplings into a chain structure.

11. A coupling structure as set forth in claim 10, wherein each of said plurality of couplings is a unitary structure.

12. A coupling structure as set forth in claim 10, wherein the linear dimension of said linear regions is greater than the diameter of said ring-shaped portion thereby decreasing the probability of accidental decoupling.

13. A coupling, comprising in combination:
a first coupling member comprising a substantially linear member;
a second coupling member having a tortuous path between the outer and the inner region of said second coupling member;
said tortuous path comprising first through fourth substantially linear sections and first through third interconnecting sections sequentially interposed between said first through fourth linear sections; and
said first coupling member being at least partially receivable in said second coupling member for passing said first coupling member through said tortuous path to couple said first coupling member to said second coupling member.

14. A coupling, comprising in combination:
a first coupling member;
a second coupling member having a tortuous path between the outer and the inner region of said second coupling member;
said tortuous path comprising first through fourth substantially linear sections and first through third interconnecting sections sequentially interposed between said first through fourth linear sections;
said first coupling member being at least partially receivable in said second coupling member for passing said first coupling member through said tortuous path to couple said first coupling member to said second coupling member; and
first connecting means including an additional first coupling member for mounting said second coupling member to a support.

15. A coupling, comprising in combination:
a first coupling member;
a second coupling member having a tortuous path between the outer and the inner region of said second coupling member;
said tortuous path comprising first through fourth substantially linear sections and first through third interconnecting sections sequentially interposed between said first through fourth linear sections;
said first coupling member being at least partially receivable in said second coupling member for passing said first coupling member through said tortuous path to couple said first coupling member to said second coupling member; and
means for connecting said second coupling member to a fabric material.

16. A coupling, comprising in combination:
a first coupling member;
a second coupling member having a tortuous path between the outer and the inner region of said second coupling member;
said tortuous path comprising first through fourth substantially linear sections and first through third interconnecting sections sequentially interposed between said first through fourth linear sections;
said first coupling member being at least partially receivable in said second coupling member for passing said first coupling member through said tortuous path to couple said first coupling member to said second coupling member; and
said first coupling member defining a substantially ring-shaped region sufficiently large to encompass said second and third substantially linear sections and concomitantly being smaller than the linear dimensions of said second and third linear sections.

* * * * *